United States Patent
Das et al.

(10) Patent No.: US 11,409,633 B2
(45) Date of Patent: Aug. 9, 2022

(54) SYSTEM AND METHOD FOR AUTO RESOLUTION OF ERRORS DURING COMPILATION OF DATA SEGMENTS

(71) Applicant: Wipro Limited, Bangalore (IN)

(72) Inventors: Rishav Das, Howrah (IN); Sourav Mudi, Burdwan (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/115,907

(22) Filed: Dec. 9, 2020

(65) Prior Publication Data

US 2022/0121554 A1    Apr. 21, 2022

(30) Foreign Application Priority Data

Oct. 16, 2020  (IN) .............................. 202041045205

(51) Int. Cl.
  *G06F 11/36*  (2006.01)
  *G06N 20/00*  (2019.01)

(52) U.S. Cl.
  CPC ...... *G06F 11/3624* (2013.01); *G06F 11/3608* (2013.01); *G06F 11/3616* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 7,607,066 B2 | 10/2009 | Gertz et al. | |
| 9,207,921 B2 | 12/2015 | Song et al. | |
| 10,558,554 B2 * | 2/2020 | Bhandarkar | G06N 20/00 |
| 2017/0212829 A1 | 7/2017 | Bales et al. | |
| 2017/0286221 A1 * | 10/2017 | Azogui | G06F 11/1048 |
| 2018/0276105 A1 * | 9/2018 | Srinivasan | G06N 20/00 |
| 2018/0341493 A1 * | 11/2018 | Roy | G06F 8/451 |
| 2018/0373515 A1 | 12/2018 | Brown et al. | |
| 2020/0097389 A1 * | 3/2020 | Smith | G06F 11/0775 |
| 2020/0218634 A1 * | 7/2020 | Jones | G06F 11/3604 |

(Continued)

OTHER PUBLICATIONS

S. Krishnan et al., "BoostClean: Automated Error Detection and Repair for Machine Learning," arXiv:1711.01299v1 [cs.DB], Nov. 3, 2017, https://doi.org/10.48550/arXiv.1711.01299 (Year: 2017).*

(Continued)

*Primary Examiner* — Andrew M. Lyons
(74) *Attorney, Agent, or Firm* — Finnegan, Henderson, Farabow, Garrett & Dunner, LLP

(57) ABSTRACT

A system and method for auto resolution of errors during compilation of data segments is disclosed. The method includes the steps of detecting one or more errors to be resolved associated with a data segment, determining an error type for each of the one or more errors from predefined error types based on neuron activations and a code logic derived from the data segment, arranging the one or more errors in a sequence of resolving, predicting a solution for each of the one or more errors, resolving the one or more errors sequentially for generating an error free data segment, and optimizing the error free data segment. The method further includes generating a pseudo code corresponding to the error free data segment and converting the pseudo code into at least one of the plurality of native languages.

18 Claims, 7 Drawing Sheets

(56) References Cited

U.S. PATENT DOCUMENTS

2020/0410288 A1* 12/2020 Capota .................. G06F 9/5072
2021/0117838 A1* 4/2021 Hassan .................. G06N 20/00

OTHER PUBLICATIONS

Z. Wang and M. O'Boyle, "Machine Learning in Compiler Optimization," in Proceedings of the IEEE, vol. 106, No. 11, pp. 1879-1901, Nov. 2018, doi: 10.1109/JPROC.2018.2817118. (Year: 2018).*

* cited by examiner

SYSTEM AND METHOD FOR AUTO RESOLUTION OF ERRORS DURING COMPILATION OF DATA SEGMENTS

TECHNICAL FIELD

The invention relates to Integrated Development Environment (IDE) system. In particular, the invention relates to system and method for auto resolution of errors during compilation of data segments.

BACKGROUND

Typically, users/programmers make five type of errors while generating data segments. From such errors, the most common error is a syntax error followed by other errors, which may include a semantic error, a compilation time error and few errors that may be a part of mathematical structure, such as a logical error and a run time error. In case, the user makes a logical error or a run-time error while developing the data segments, then it may take longer period to identify and resolve the logical error or the run-time error.

Additionally, sometimes, due to syntax error and semantic error, the compiler lands in unknown states. At that instant, it is difficult to understand the next preceding state for the compiler. As a result, the compiler may throw an error to the user. This situation may be referred as deadlock condition. Further, identification of logical error is difficult as it may remain unknown even to the user.

Various conventional systems and methods are available for resolution of errors. However, the conventional systems and methods lack in determining errors made by human and fixing the errors before compilation. Further, the conventional techniques determine syntax error, but do not have a capability to learn from end users and re-correct it. Additionally, the conventional techniques are not capable of determining logical errors as well as run-time errors effectively. Also, the conventional techniques are rule-based, and hence consume more time and memory for interpretation and compilation.

SUMMARY

In one embodiment, a method for auto resolution of errors during compilation of data segments is disclosed. In one embodiment, the method may include detecting one or more errors to be resolved associated with a data segment. The method may further include determining an error type for each of the one or more errors from predefined error types based on neuron activations and a code logic derived from the data segment. The error type may be determined by labelling a new error type upon identification of a new error. The method may further include arranging the one or more errors in a sequence of resolving based on their error types. The method may further include predicting a solution for each of the one or more errors by fetching historical data within a database and provided by a user using a deep learning model. It should be noted that the identified new error type and associated solution may be stored in the database. The method may further include resolving the one or more errors sequentially for generating an error free data segment based on the predicted solution for each of the one or more errors. The method may further include optimizing the error free data segment based on standard rules, using a machine learning model trained with a plurality of native languages. The error free data segment may be optimized by generating a pseudo code corresponding to the error free data segment based on encoding and decoding technique and converting the pseudo code into at least one of the plurality of native languages using a transfer learning model. It should be noted that a similar code logic may be used for interfacing with any of the plurality of native languages.

In yet another embodiment, a system for auto resolution of errors during compilation of data segments is disclosed. The system includes a processor and a memory communicatively coupled to the processor, wherein the memory stores processor instructions, which, on execution, cause the processor to detect one or more errors to be resolved associated with a data segment. The processor instructions further cause the processor to determine an error type for each of the one or more errors from predefined error types based on neuron activations and a code logic derived from the data segment. The processor instructions further cause the processor to label a new error type upon identification of a new error. The processor instructions further cause the processor to arrange the one or more errors in a sequence of resolving based on their error types. The processor instructions further cause the processor to. predict a solution for each of the one or more errors by fetching historical data within a database and provided by a user using a deep learning model. It should be noted that the identified new error type and associated solution may be stored in the database. The processor instructions further cause the processor to resolve the one or more errors sequentially for generating an error free data segment based on the predicted solution for each of the one or more errors. The processor instructions further cause the processor to optimize the error free data segment based on standard rules, using a machine learning model trained with a plurality of native languages. To optimize the error free data segment, the processor instructions further cause the processor to generate a pseudo code corresponding to the error free data segment based on encoding and decoding technique and to convert the pseudo code into at least one of the plurality of native languages using a transfer learning model. It should be noted that a similar code logic may be used for interfacing with any of the plurality of native languages.

In yet another embodiment, a non-transitory computer-readable medium storing computer-executable instruction for auto resolution of errors during compilation of data segments is disclosed. In one example, the stored instructions, when executed by a processor, may cause the processor to perform operations including detecting one or more errors to be resolved associated with a data segment. The operations may further include determining an error type for each of the one or more errors from predefined error types based on neuron activations and a code logic derived from the data segment. The error type may be determined by labelling a new error type upon identification of a new error. The operations may further include arranging the one or more errors in a sequence of resolving based on their error types. The operations may further include predicting a solution for each of the one or more errors by fetching historical data within a database and provided by a user using a deep learning model. It should be noted that the identified new error type and associated solution may be stored in the database. The operations may further include resolving the one or more errors sequentially for generating an error free data segment based on the predicted solution for each of the one or more errors. The operations may further include optimizing the error free data segment based on standard rules, using a machine learning model trained with a plurality of native languages. The error free data segment may be optimized by generating a pseudo code corresponding to the error free data segment based on encoding and decoding technique and converting the pseudo code into at least one of the plurality of native languages using a transfer learning model. It should be noted that a similar code logic may be used for interfacing with any of the plurality of native languages.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
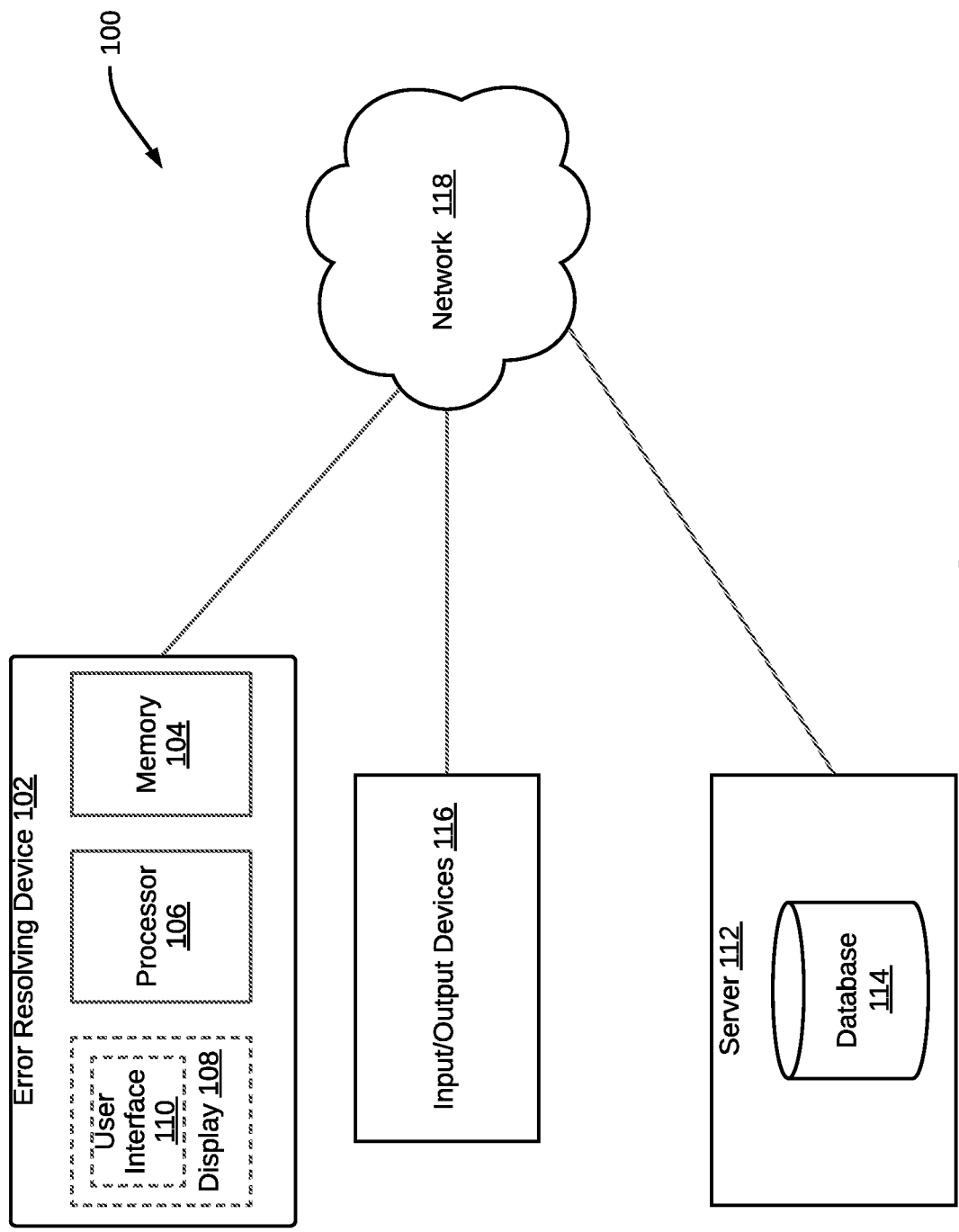
FIG. 1 is a block diagram of a system for auto resolution of errors during compilation of data segments, in accordance with an embodiment.

In one embodiment, a system 100 for auto resolution of errors during compilation of data segments is illustrated in the FIG. 1. The system 100 may include an error resolving device 102 configured to resolve the errors (for example, a syntax error, a semantic error, a compilation time error, a logical error and a run time error) during compilation of the data segments. Examples of the error resolving device 102 may include, but are not limited to, a server, a desktop, a laptop, a notebook, a netbook, a tablet, a smartphone, a mobile phone, an application server, or the like.

The error resolving device 102 may include a memory 104, a processor 106, and a display 108. The memory 104 and the processor 106 of the error resolving device 102 may perform various functions including detecting the errors in the data segments, determining types of the errors, arranging the errors in a sequence of resolving, predicting solutions for the errors, resolving the errors, and optimizing error free data segments. The memory 104 may store instructions that, when executed by the processor 106, cause the processor 106 to generate the error free data segments and then to optimize the error free data segments. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The display 108 may further include a user interface 110. A user or the administrator may interact with the error resolving device 102 and vice versa through the display 108. By way of an example, the display 108 may be used to display results of analysis (i.e., different types of errors in the data segments, and error free and optimized data) performed by the error resolving device 102, to the user. By way of another example, the user interface 110 may be used by the user to provide inputs to the error resolving device 102. The user may provide solutions to resolve the errors that may be further used for training a deep learning model within the error resolving device 102.

As will be described in greater detail in conjunction with FIG. 2 to FIG. 10, in order to generate optimized error free data segments, the error resolving device 102 may extract data from a server 112. The server 112 may further include a database 114 to store various type of data.

The data may also be received by the error resolving device 102 from one or more of a plurality of input/output devices 116. Examples of the plurality of input/output devices 116 may include, but are not limited to, a desktop, a laptop, a notebook, a netbook, a tablet, a smartphone, a remote server, a mobile phone, or another computing system/device. The error resolving device 102 may resolve the errors associated with the data segments and may then share the resultant error free optimum data with one or more of the plurality of input/output devices 116. The plurality of input/output devices 116 may be communicatively coupled to the error resolving device 102, via a network 118. The network 118 may be a wired or a wireless network and the examples may include, but are not limited to, the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
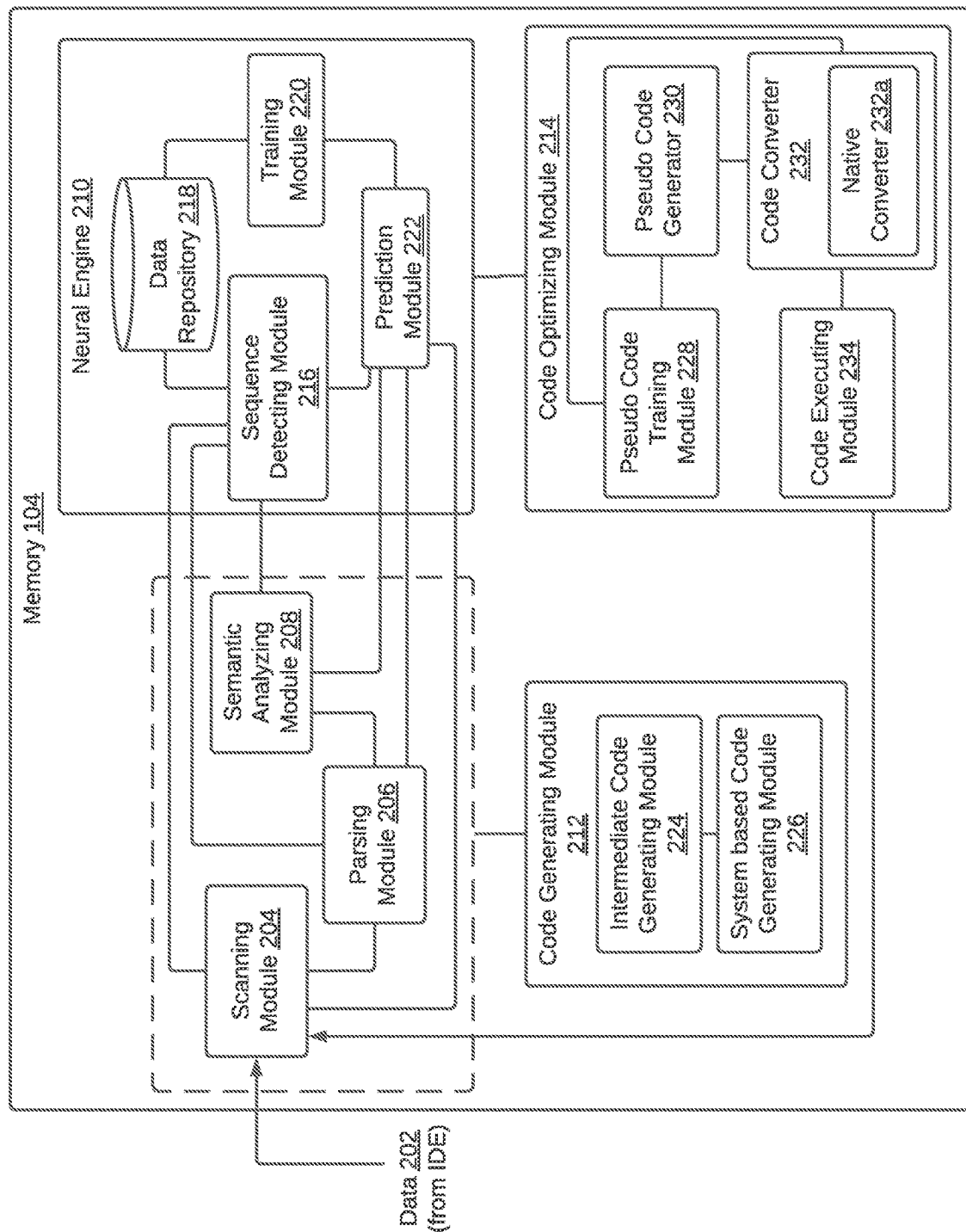
FIG. 2 is a functional block diagram of various modules within a memory of an error resolving device configured to resolve errors automatically during compilation of data segments, in accordance with an embodiment.

Referring now to FIG. 2, a block diagram of various modules within the memory 104 of the error resolving device 102 configured to resolve errors during compilation of data segments is illustrated, in accordance with an embodiment. The memory 104 may receive data 202 from an Integrated Development Environment (IDE). It should be noted that the data 202 may correspond to a software code. A user or developer may use the IDE to develop the software code in a composite space. This may enable parsing an error in a syntax and associating developers with other facilities such as, continuous build, and continuous integration pipelines.

The memory 104 includes various modules for performing multiple operations in order generate error free data segments. The modules within the memory 104 may include a scanning module 204, a parsing module 206, a semantic analyzing module 208, a neural engine 210, a code generating module 212, and a code optimizing module 214. Further, the neural engine 210 may include a sequence detecting module 216, a data repository 218, a training module 220, and a prediction module 222.

The scanning module 204 may be configured to receive the data 202 from the IDE. Further, the scanning module 204 may convert the data 202 or a data item stream of characters into error types or data segments. This process of conversion may also be referred as error tokenization in a Natural Language Processing (NLP). Further, the scanning module 204 may perform various operations, such as expanding macros, determining indents, and removing components and whitespaces. In addition to these operations, the scanning module 204 may determine state of the error types or lexicons predefined by a programming language. It should be noted that syntax dignity of the software code may be maintained by the scanning module 204. By way of an example, in case of detecting an inappropriate syntax (i.e. an error), as per standards, a compiler usually may not proceed further and only transmit the error to a user. In that case, the scanning module 204 may communicate with the neural engine 210 to remove the error and rectify it, instead of transmitting the error to the user. Further, the scanning module 204 may transmit the data segments to the sequence detecting module 216 of the neural engine 210. In some embodiments, the scanning module 204 may transmit the generated output to the parsing module 206 using a transmission channel.

The parsing module 206 may receive the data segments from the scanning module 204. Further, the parsing module 206 may help in following the syntax and may further parse the data following system calls of the compiler. Further, the parsing module 206 may turn the data segments into abstract syntax tree using a parsing technique. In a lexical analysis, the compiler may not determine various syntax due to limited regular expression. Pattern matching may also become challenging for the compiler and resulting in delayed compilation. Therefore, the parsing module 206 may determine a syntax error by performing a syntax analysis. It should be noted that the syntax analysis helps in determining the syntax using a Context Free Grammar (CFG). The parsing module 206 may forward the determined syntax error to the neural engine 210, where the syntax error may be automatically rectified rather than forwarding it to the user. Moreover, the parsing module 206 may transmit the data segments to the neural engine 210, where the compiler may predict an error type associated with the data segments. Further the parsing module 206 may be communicatively connected to the semantic analyzing module 208.

Further, semantic analyzing module 208 may perform semantic analysis and provide rules to the data segments and the CFG. Semantics may facilitate to interpret symbols, their types, and their relations with each other. In some embodiments, it may be also be analyzed if a syntax structure formed in the data 202 (e.g., a source code) derives any meaning or not. In the semantic analysis, common errors may include grammar mismatch, type mismatch, identifier misuse, and scope of a variable. Further, the errors may be thrown to the neural engine 210 for rectification and dilution.

The neural engine 210 may receive the data segments from the scanning module 204, the parsing module 206, and the semantic analyzing module 208. In some embodiments, the neural engine 210 may learn properties of the data segments. Further, in some other embodiments, the neural engine 210 may be configured to determine errors, such as syntax errors, run time errors, and exception handling errors, and eliminate the errors from the error types/data segments rather than manually spending extra time in debugging. The sequence detecting module 216 of the neural engine 210 may be configured to receive the data segments and associated errors from any of the scanning module 204, the parsing module 206, and the semantic analyzing module 208. In some embodiments, mapping may be performed using a hash map technique in order to resolve the errors. There may be a plurality of errors associated with a single data segment. In such case, the errors associated with the single data segment may be resolved sequentially based on priorities assigned to the errors. It may be noted that the errors need to be fixed based on penetration in the compiler. The errors may be arranged in a sequence of resolving and further may be fed into the training module 220. In case the neural engine 210 is already trained for the detected error types, the errors that arranged in the sequence of resolving may be directly fed to the prediction module 222. The prediction module 222 may predict solutions for the errors by fetching historical data within a database, for example the data repository 218 and provided by a user. Otherwise, the sequence detecting module 216 may detect un-trained or unlabeled errors that are new for the neural engine 210 and not present the data repository 218, for further tracking of solutions. In case of unstructured data, the determined sequence of resolving the errors may be stored in the data repository 218 by creating an instance on it and later may be resolved when the neural engine 210 is trained.

The data repository 218 may be interlinked between the sequence detecting module 216 and the training module 220. The data repository 218 may store the derived sequences of resolving the errors received from the sequence detecting module 216. These sequences may be used further for training and correcting the errors associated with the data segments. Further, the stored data from the data repository 218 may be extracted by the training module 220, when required.

The training module 220 may extract the data for training and learning overall sequence and determining the errors. The training module 220 may store trained values or checkpoints in the data repository 218 corresponding to the requested data segments. In some embodiments, the training module 220 of the neural engine 210 may be responsible for training error codes with the predicted solutions for that instance. The error codes may be observed based on standard programming protocols and number of occurrences. It should be noted that the number of occurrences may be tuned by the user and further it may be added manually. For example, the error which needs to be resolved, may be added into the neural engine 210 along with a solution (i.e., solution performed earlier by the user when a same error is occurred). The training module 220 may be configured to train the error codes and for tuning accurately, using a N-Fold Cross validation technique. Once the accuracy reaches to 95% or above, then it is automated by the compiler for a next rectification. Further, the training module 220 is configured to send the trained checkpoints to the prediction module 222, which may be used further predicting solutions directly. The checkpoints may be updated, when retraining of similar data segments is performed.

The prediction module 222 may receive the errors arranged in the sequence of resolving and corresponding checkpoints derived by the training module 220. Further, the prediction module 222 may be configured to predict a solution to resolve the errors associated with the data segments. A Long-Short Term Memory (LSTM) model may interpret the sequence of resolving the errors and predict a correct set of action plans for compilation of the errors. Further, the predicted solutions may also be verified by the user. In case, the predicted solutions are not acceptable by the user, the prediction module 222 may backtrack the changes provided by the user. And, the neural engine 210 may be further trained with the same sequence in order to resolve a similar kind of errors in future. Further, the prediction module 222 may be configured to provide error free data segments or corrected output to every unit from which a request is made. In some embodiments, the prediction module 222 predicts whether there is any logical error or the syntactical error in the data segments.

The code generating module 212 may include an intermediate code generating module 224 and a system-based code generating module 226. The intermediate code generating module 224 may be configured to receive the data segments from the semantic analyzing module 208. Further, the intermediate code generating module 224 may also be configured to directly transform the data segments into target data segments. However, it may create a problem for a unique machine translation. Hence, the intermediate code generating module 224 may create similar data segments irrespective of machine translation and independent of other platforms. The intermediate code generating module 224 may create a flow chart among the data segments and determine a correct flow of compilation to be executed, in order to transform the data segments into common data items. The common data items may include Low Intermediate Representation (IR) and High IR. It should be noted that the Low IR is near to target machine data items.

The system-based code generating module 226 may receive the output processed by the intermediate code generating module 224. The system-based code generating module 226 may generate assembly level language-based data from high level programming language. It should be noted that a processor is capable to understand and interpret the low-level assembly language. The system-based code generating module 226 may convert high level language into a low-level language using explored variables and process details from the intermediate code generating module 224. The system-based code generating module 226 varies based on different Original Equipment Manufacturers (OEM) and their methods of interpreting values.

The code optimizing module 214 may include a pseudo code training module 228, a pseudo code generator 230, a code converter 232, and a code executing module 234. The pseudo code training module 228 may be configured to receive the predicted outcomes and error free data segments. In some embodiments, a core algorithm or logic of a native code may be converted into another defined programming language. Thus, not only the error or logic is reduced but also optimized code may be generated. The optimized code may help in reducing computation cycles and provides optimized delivery of the execution of compiler. It should be noted that the pseudo code training module 228 is another neural network which takes input from the prediction module 222 and train itself to correct the pseudo code. The trained optimized dataset may be further utilized for converting the pseudo code into another native programming language.

The pseudo code generator 230 is communicatively connected to the pseudo code training module 228 and the code converter 232. The pseudo code generator 230 may be configured to generate the pseudo code corresponding to the error free data segments based on encoding and decoding technique. It should be noted that pseudo code generator 230 has defined standard regulation that may be acceptable for different native programming languages In some embodiments, at least one of a predictive analytics, a machine learning and a deep learning technique, may be used for generating the pseudo code. Further, the pseudo code may be generated using a dictionary of set of rules. And, mapping may be performed by performing predictive analysis using a machine learning model. It should be noted that pseudo code rules may be defined by the user for certainty in different aspect of code derivation.

Further, the code converter 232 is operatively connected to the pseudo code training module 228 and the code executing module 234. The code converter 232 receives an input on rules from dictionary of pseudo code generator 230. The code conversion may be performed using the machine learning and NLP solving techniques. The code converter 232 may include a native converter 232a that receives input from the pseudo code generator 230 and uses pseudo code training module 228 to reiterate conversion of pseudo code into the native programming language. It should be noted that native code conversion may be performed based on the trained dataset which is used previously to generate the pseudo code.

The code executing module 234 employs a pseudo compiler that may parse and maintain the semanticity of the pseudo code. The code executing module 234 may analyze the pseudo code execution and may determine results similar to the native programming language. This way, accuracy may be measured from Programme-to-Programme (PoP) measurement between two compilers. The PoP measurement may enable analyzation of both of the parser datasets that may be used to detect a line of faulty pseudo code. Post matching the compilation error of the dataset, the code may be ready for further transformation to any other native programming language. This may be performed by pre-training the machine learning model with pseudo code to native language code conversion. The conversion may be performed using any of the dictionary-based solution or based on predictive analysis.

Figure 3:
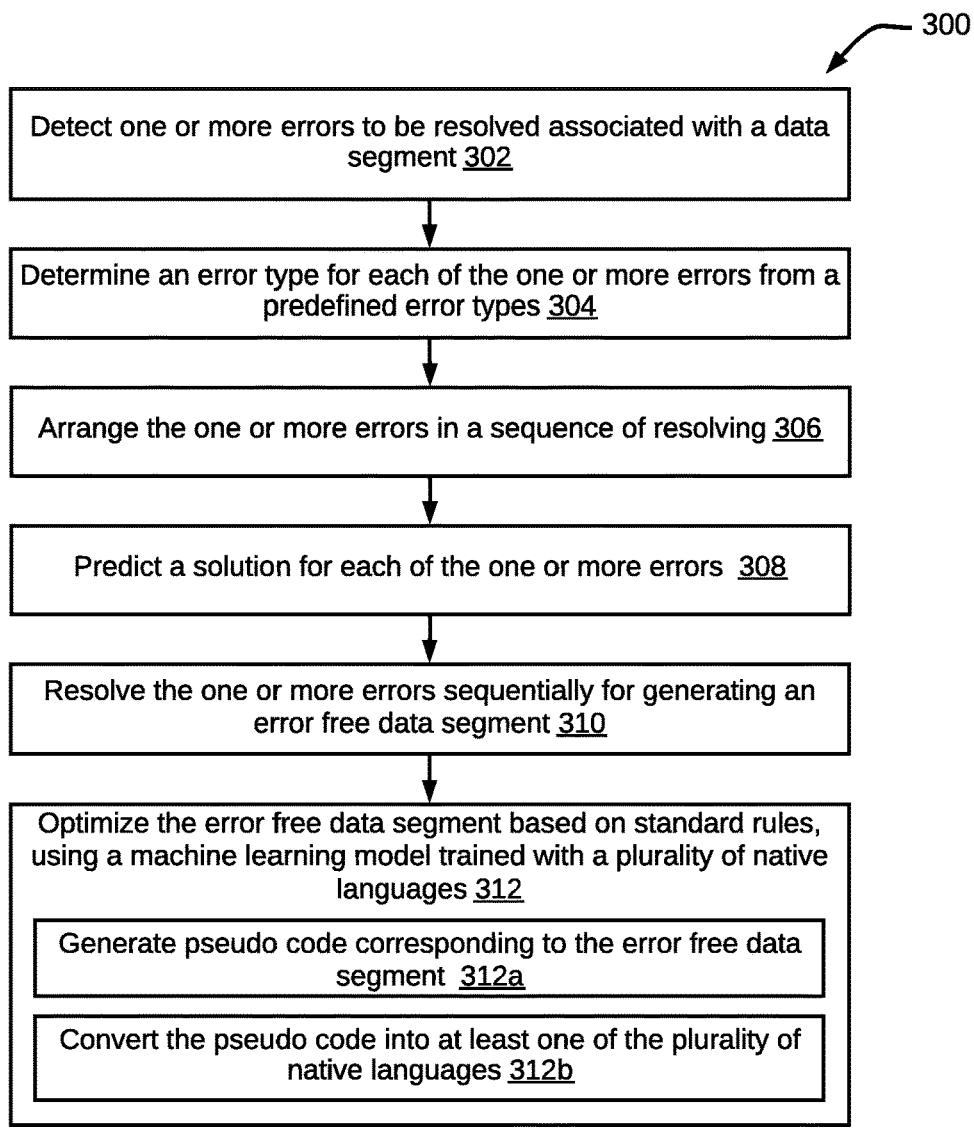
FIG. 3 is a flowchart of a method for auto resolution of errors during compilation of data segments, in accordance with an embodiment.

Referring now to FIG. 3, a method for auto resolution of errors during compilation of data segments is depicted via a flowchart 300, in accordance with an embodiment. Each step of the flowchart 300 may be performed by one or more of the modules 204-234 within the memory 104. At step 302, one or more errors associated with a data segment may be detected. It should be noted that the one or more errors may include at least one of a syntax error, a semantic error, a compilation time error, a logical error and a run time error. At step 304, an error type may be determined for each of the one or more errors from predefined error types. It should be noted that the error type may be determined based on neuron activations and a code logic derived from the data segment. In some embodiments, a new error type may be labelled upon identification of a new error.

At step 306, the one or more errors may be arranged in a sequence of resolving based on their error types. At step 308, a solution for each of the one or more errors may be predicted by fetching historical data within a database and provided by a user. It may be noted that a deep learning model may be employed to predict the solution. In some embodiments, the identified new error type and associated solution may be stored in the database. At step 310, the one or more errors may be resolved sequentially for generating an error free data segment. It should be noted that the one or more errors may resolved based on the predicted solution for each of the one or more errors.

At step 312, the error free data segment may be optimized by the error resolving device, based on standard rules. Further, a machine learning model may be used to optimize the error free data segment. The machine learning model may be trained with a plurality of native languages. The plurality of native languages corresponds to the native programming languages. In some embodiments, a pseudo code corresponding to the error free data segment may be generated at step 312a. It should be noted that encoding and decoding techniques may be used to generate the pseudo code. At step 312b, the pseudo code may be converted into at least one of the plurality of native languages.

In some embodiments, the data (for example, the data 202) may be forwarded to a compiler for executing the data segments. For example, when a user requests the IDE for compiling the data segments, memory units and kernel may store the data segments and the compiler may be operated for creating a memory instance. Thereafter, process of scanning may be initiated. To establish connections between different modules, connection protocols such as, serial bus (USB), network protocols (for example, HTTP, NTP, NFS, SMTP, SMPP, DHCP, Telnet, and the like), PCIe, android system calls, core system calls, or the like may be used. It should be noted that standard data connection means including wireless or wired may be used to establish the connection. Additionally, in some embodiments, serial advanced technology attachment (SATA), integrated drive electronics (IDE), IEEE-1394, Universal Serial Bus (USB), fiber channel, small computer systems interface (SCSI), STD bus, RS-232, RS-422, RS-485, I2C, SPI, Microwire, 1-wire, IEEE 1284, Intel QuickPathInterconnect, InfiniBand, and PCIe, using standard data connection means such as wireless or wired, may be employed to establish the connection.

Further, the one or more errors associated with the data segments may be detected by the compiler while performing a lexical analysis. The scanned one or more errors may be then sent to a data repository (for example, the data repository 218) and solutions provided by the user may be observed for the detected one or more errors. If the solutions for the detected one or more errors are already provided by the user, then there is no need to train a deep learning model. In that case the deep learning model is already trained and directly a solution for each of the one or more errors may be predicted by the prediction module 222. On the other hand, if the one or more errors are not traced or tracked then a new sequence may be detected and stored into the data repository 218 for further use when similar type of errors are detected. This may help to learn all classes and categories/types of the errors along with respective solutions provided by the user. Sometimes, it is possible that a common solution may resolve two different type of errors.

In some embodiments, the new error type may be initially labeled to train the deep learning model for determining a sequence of resolving the one or more errors. The one or more errors may be arranged based on priorities assigned to different error types. It should be noted that unnecessary weight allocation in the neural engine 210 may be reduced by assigning priorities. By way of an example, consider a scenario where a data segment includes two different errors.

One of the two errors may be resolved by performing a lexical analysis and other may be resolved by performing a sematic analysis. In that case, the lexical analysis may be primly performed, and associated error type may be assigned with a first priority. It should be noted that the semantic analysis may not be performed without performing the lexical analysis. Therefore, lexical analysis is assigned with first priority and the semantic analysis is assigned with second priority. Different type of errors may be resolved by performing different analysis. Here, each layer of the sequence may be named, i.e. "LEX" for Lexical analysis, "PAR" for parser, "SEM" for semantic analysis.

Further, in some embodiments, the one or more errors along with their solutions may be stored in the data repository 218 intending to train and label itself. This may be performed by examining the solutions provided by the user or predefined solutions provided by the user or a source code development protocol. In particular, for each of the one or more errors, the solution may be traced by creating memory instance in a computation unit. This may help to store incorrect as well as correct solutions. Further, difference between the correct and incorrect solution may be used to determine changes incorporated by the user. The changes may be referred as training dataset and may further be used to predict required changes in actual dataset. A condition of data saturation may occur when the dataset is traced based upon a threshold of data points or samples. The user may also be able to determine the threshold.

The errors stored in the data repository 218 or memory 104 as the instance may be fetched whenever the threshold is crossed. Thereafter, training may be initiated. Before training, the data segments may get auto labeled for all the dataset and then may be stored temporarily in the memory. The dataset may further be forwarded for training based on probability distribution. To this end, the training may be performed by adding the labeled dataset into neurons. The neurons may take the data segment as an input via an input layer and further fed them to a connected forget gate layer. The input layer may include an activation layer. Further, the activation layer may receive the data segment and further transform the data segment and pass it through the forget layer to remove the unnecessary erroneous part. Post determining a cleaned dataset, a learning unit may get activated in order to receive the error codes along with labels. The error/error code may be trained based on a number of occurrence and a similar solution provided every time. This may help the error code to get trained along with an activation function. Sometimes, a predefined error code given by the user may not have enough training sample to train these error codes, in such cases the error code gets auto generated by the training module 220, in order to maintain a weight ratio among other error codes. This concurrent training along with the batch cycle may help the deep learning model to remember the errors and associated solutions. Further, after completion of the training checkpoints may be created and stored in the data store 218. The error code may also be retrained when any modification is performed in the associated solution by the developer or user. Further, a deviation in predicted solution from human interpreted solution may be observed. The change may be utilized as a use case for further improvement and increasing accuracy of the system 100. A checkpoint corresponding to a new solution may then be added to the main checkpoint of the error code. Sometimes, a bias value may be determined based on the priority of the error code.

It should be noted that the checkpoint is the constructive matrix that may be developed of weights and helps to remember patterns of learning. The checkpoints may be induced with the input or incoming weight that may further help to determine correct solution based upon categories of the checkpoints. Also, the checkpoint may be updated with new values for re-correction of the error that may be updated in next phase. The checkpoints may be attached with solutions, thereby links a problem statement with a solution. The checkpoints may be stored in the database, such as the data repository 218.

With regards to the checkpoints, solutions may be predicted by the prediction module 222. Further, the error codes may be interpreted and passed through the corresponding checkpoint for predicting an output. The checkpoint receives the error and activate its values for determining the solution for the error. The solution may be then forwarded to an addressing component or respective class of component. If the solution is not matched and the user reverts back with the solution. In that case, changes may be observed based on few threshold points and the training for that error code may again be initiated. The continuous cycle keeps on going for all the error codes.

An error may be generated when a mismatch between predicted solution and human provided solution is identified. The mismatch between both the solutions may be learned depending on stress factor of LSTM data input. It should be noted that the solution may get wrongly mapped when an intent is wrong. Hence, the error codes may be mapped with intent while training the error code. And, it should have maximum number of frequency threshold for deep classification. Humans can examine this before learning the error type of the errors. The training may be provided again, once the intent or an entity is set. It should be noted that error free data segment may correspond to a core native code.

Further, in some embodiments, the error free data segment in core native language may be converted into pseudo code. The pseudo code training module 212 may be trained with data labels of the pseudo code, as explained in FIG. 2. This may be further used to predict the error free outcome in core native language from Neural Engine 210. Alternatively, in some embodiments, this operation may also be performed by a dictionary-based encoding/decoding techniques. The data labels are trained based upon the coding standards (for example, standard rules of programming language) that are required to be followed by the neural engine 210 while converting the error free code into pseudo code.

To optimize the code either coding standards (for example, rule-based heuristics) or machine learning standpoint (for example, the machine learning model) may be used. The optimization becomes more efficient than maintaining the coding standards, when the Naiive bayes classifier is used to determine probable condition and performance of a code segment. In some embodiments, the Naiive bayes classifier may be used to classify different optimization techniques by extracting historical data from the LSTM model. The historical data may be used by Naiive bayes classifier to determine or compute probability of optimization and based a task of optimization may be scheduled. The Naiive Bayes classifier may help in comparing different optimization techniques. It should be noted that weightage to understand data execution may be compiled over an execution platform. Further, the execution platform with least availability of resource or having certain constraint of resources may be used as weightage in order to reduce the code latency.

Further, presence of error may be checked before converting the pseudo code into at least one of the native programming languages. In case, the error is present, then it may be re-corrected. A pseudo code compiler may help in determining code content, associate attributes, methods, and other programming linguistics. The compiler may be designed based on standardization of pseudo codes. Post compilation of the pseudo codes, the pseudo codes may be converted into at least one of the native programming languages based upon the coding standards.

After converting a code in high level language and determining values, variables, functions and process of execution, an intermediate code may be generated. Here, the datasets may be used to create an intermediate code for processor and kernel to understand operation of the process to be handled. Further, in some embodiments, the code may be converted from high level programming language to assembly level language. This may help the compiler to interpret the data segments in machine understandable language. Once the data item is converted, the processes may be scheduled by the processor to execute them and return the desired output to the user.

Figure 4:
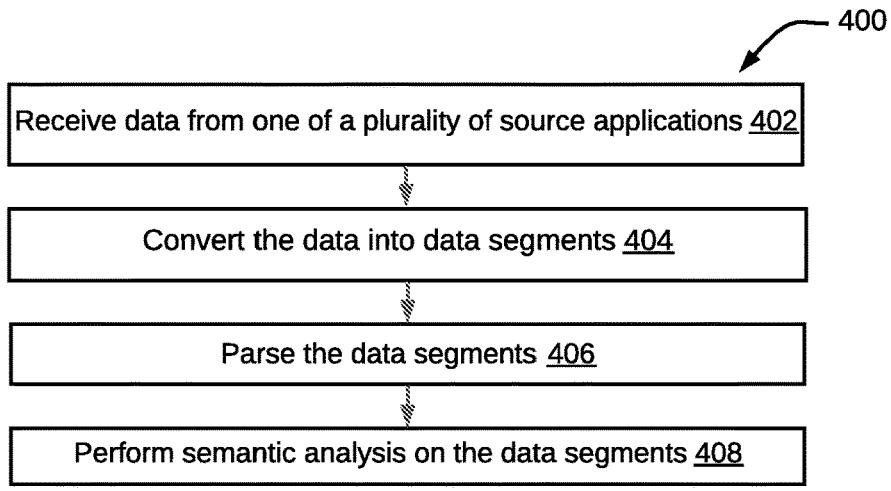
FIG. 4 is a flowchart of a method for performing semantic analysis on the data segments, in accordance with an embodiment.

Referring now to FIG. 4, a method for performing semantic analysis on the data segments is depicted via a flowchart 400, in accordance with an embodiment. At step 402, data may be received from one of a plurality of source applications. It should be noted that the plurality of source applications may be developed using at least one of a JAVA, C, C++, Python, and Scala language. At step 404, the data may be converted into data segments using the scanning module 204. At step 406, the data segments may be parsed using the parsing module 206. At step 408, semantic analysis may be performed on the data segments using the semantic analyzing module 208. This has already been explained in conjunction with FIG. 2.

Figure 5:
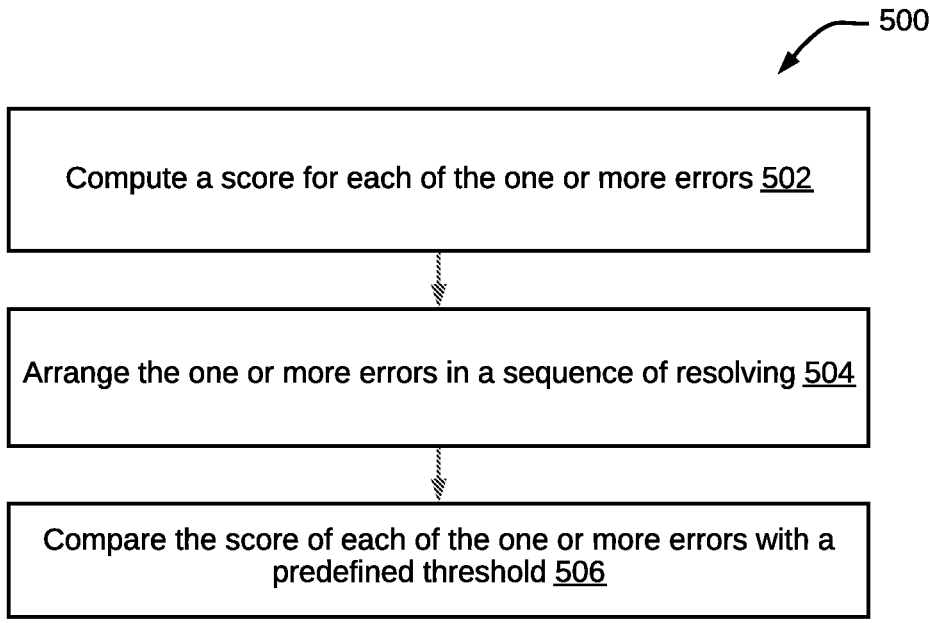
FIG. 5 is a flowchart of a method of arranging the one or more errors in a sequence of resolving, in accordance with an embodiment.

Referring now to FIG. 5, a method of arranging the one or more errors in a sequence of resolving is depicted via a flowchart 500, in accordance with an exemplary embodiment. Each step of the method may be performed using the sequence detecting module 216 of the neural engine 210. At step 502, a score may be computed for each of the one or more errors. At step 504, the one or more errors may be arranged in a sequence of resolving based on the associated score. At step 506, the score of each of the one or more errors may be compared with a predefined threshold.

Figure 6:
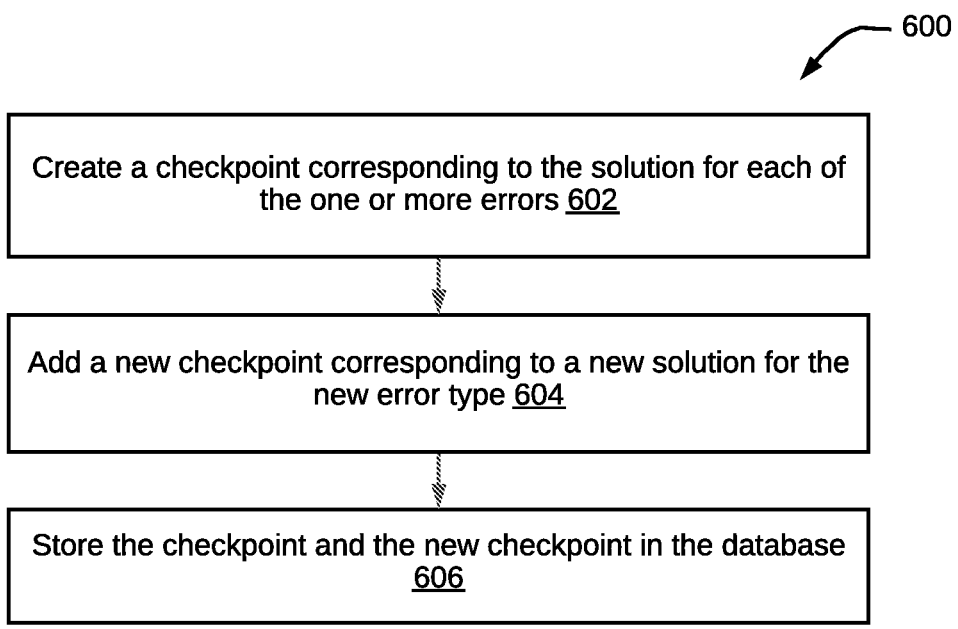
FIG. 6 is a flowchart of a method for resolving the one or more errors, in accordance with an embodiment.

Referring now to FIG. 6, a method for resolving the one or more errors is depicted via a flowchart 600, in accordance with an exemplary embodiment. Each step of the flowchart 600 may be performed using the neural engine 210. At step 602, a checkpoint corresponding to the solution for each of the one or more errors may be created. At step 604, a new checkpoint corresponding to a new solution for the new error type. At step 606, the checkpoint and the new checkpoint may be stored in the database (for example, the data repository 218). It should be noted that the checkpoint is a constructive matrix assigned with weights for learning patterns.

It should also be noted that the checkpoint and the new checkpoint may be composed with updated or trained values. This may be performed by the training module 220. The checkpoint and the new checkpoint are created based on training of a re-corrected model. Further, training of the deep learning model may be explained in conjunction to FIG. 7. In some embodiments, new checkpoints may be mapped with existing checkpoints. For example, when a change may be identified while mapping the new and existing checkpoints. In that case an action to be taken for resolving the one or more errors may also change. It should be noted that a minor change may not change associated action. However, major change in checkpoint values may lead to change in associated action accordingly. Once the checkpoints are updated, these may be further accessed for predicting the action to resolve the errors, based upon input dataset.

Figure 7:
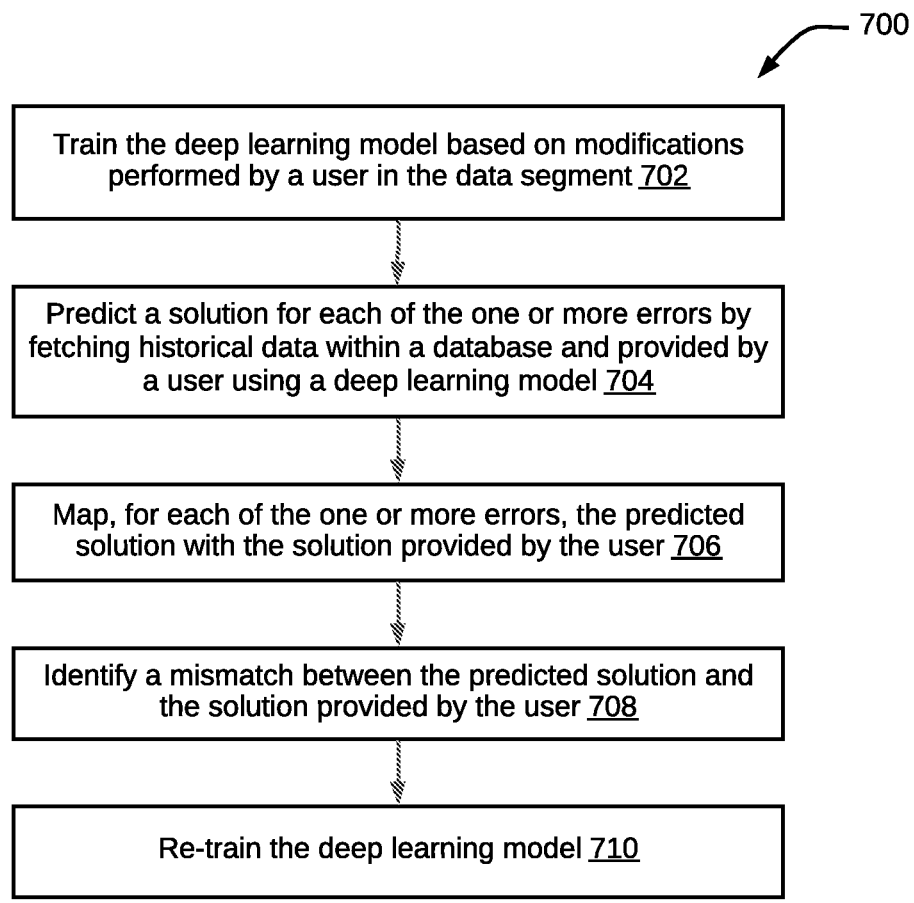
FIG. 7 is a flowchart of a method for training a deep learning model for predicting accurate solution for the errors, in accordance with another embodiment.

Referring now to FIG. 7, a method for training the deep learning model for predicting accurate solution for the errors via a flowchart 700, in accordance with an embodiment. At step 702, the deep learning model may be trained. It should be noted that modifications performed by the user in the data segment for resolving the one or more errors may be considered for training the deep learning model. At step 704, a solution for each of the one or more errors may be predicted by fetching historical data within a database and provided by a user using a deep learning model. At step 706, the predicted solution may be mapped with the solution provided by the user. It should be noted that the mapping may be performed for the predicted solution for each of the one or more errors. At step 708, a mismatch between the predicted solution and the solution provided by the user may be identified. At step 710, the deep learning model may be re-trained.

Figure 8:
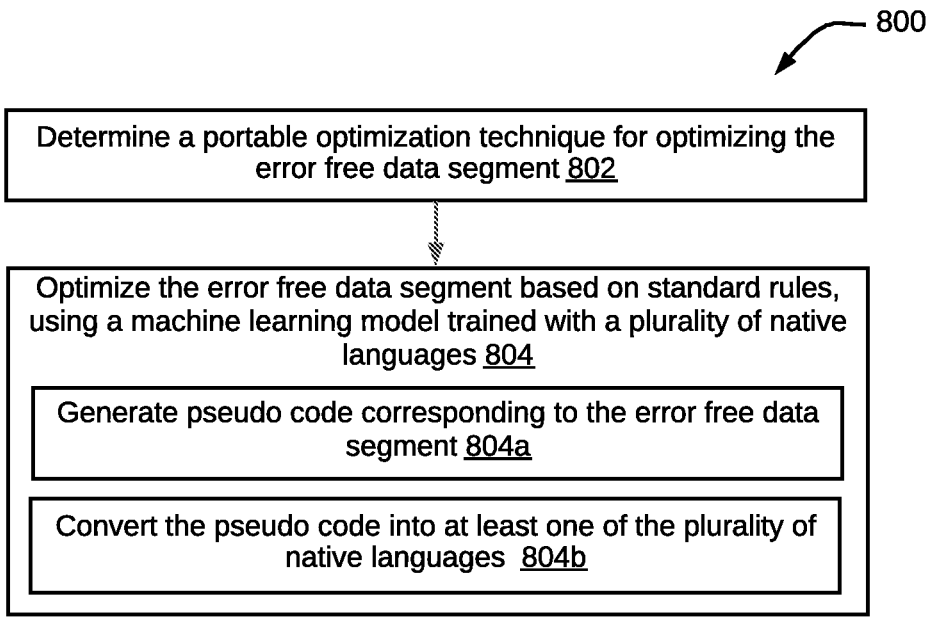
FIG. 8 is a flowchart of a method for optimizing the error free data segment, in accordance with another embodiment.

Referring now to FIG. 8, a method for optimizing the error free data segment is depicted via a flowchart 800, in accordance with an exemplary embodiment. At step 802, a portable optimization technique may be determined optimizing the error free data segment depending upon an application. It should be noted that a Naive Bayes classifier may be used to determine the probable optimization technique. At step 804, the error free data segment may be optimized based on standard rules, using a machine learning model. The machine learning model rules, using a machine learning model may be trained with a plurality of native languages. At step 804a, pseudo code corresponding to the error free data segment may be generated. It should be noted that encoding and decoding techniques may be used to generate the pseudo code. At step 804b, the pseudo code may be converted into at least one of the plurality of native languages using a transfer learning model. It should be noted that a similar code logic is used for interfacing with any of the plurality of native languages.

Figure 9:
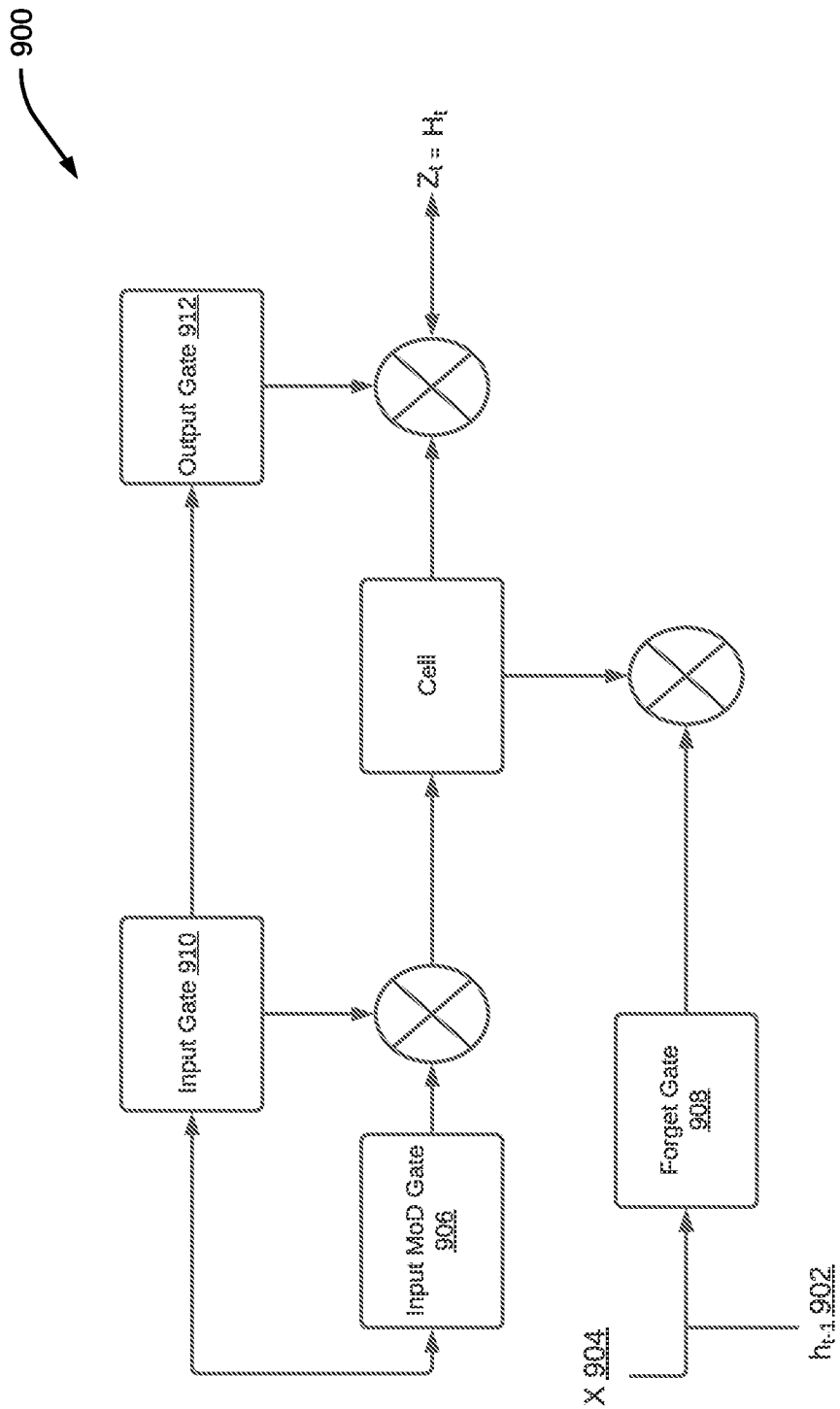
FIG. 9 is a block diagram of an exemplary system for modulating a core native code into a pseudo code, the in accordance with an embodiment.

Referring now to FIG. 9, an exemplary system 900 for modulating the core native code into the pseudo code is illustrated, in accordance with an exemplary embodiment. The system 900 may use an LSTM model. Here, 'ht-1' 902 represents previously trained dataset and 'X' 904 may be a new input that may be used for learning the category/cluster as well pseudo translation of the dataset. The system 900 includes an input MoD gate 906 that helps in modulating the input dataset. For example, when the input dataset cluster is selected, the modulation may also add weightage to a specific element of that detected class. The system 900 may also include a forget gate 908, which is already explained in conjunction with FIG. 2. Additionally, the system, 900 includes an input gate 910 and an output gate 912 to receive and transmit the data, respectively.

The present disclosure may provide many advantages in order to overcome the problems encountered in conventional systems and methods. As discussed above, the present disclosure may detect and resolve different type of errors, for example detecting lexical errors by performing lexical analysis and providing solution for the detected lexical errors. Moreover, the disclosed system is robust and does not require any human intervention to resolve the errors/problems. In addition to this, the system provides faster interpretation, less time consumption for developing data segments, automatic query interpretation without any rule classification, and error free parsing capability.

Figure 10:
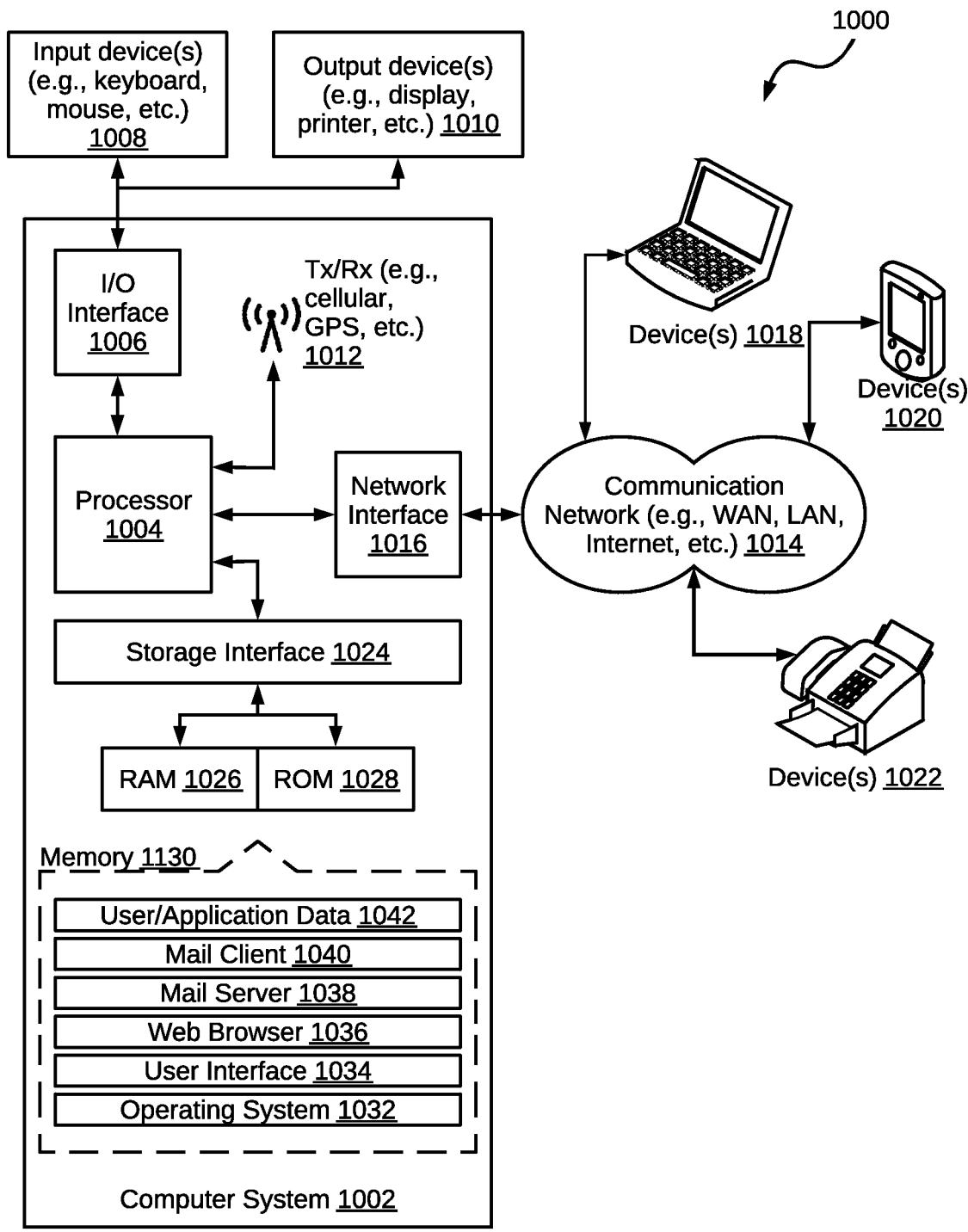
FIG. 10 illustrates a block diagram of an exemplary computer system for implementing embodiments consistent with the present disclosure.

Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLON® microprocessor, DURON®) microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1402.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1004 may be disposed in communication with a communication network 1010 via a network interface 1016. Network interface 1016 may communicate with communication network 1014. Network interface 1016 may employ connection protocols including, without limitation, direct connect, Ethernet (for example, twisted pair 50/500/5000 Base T), transmission control protocol/internet protocol (TCP/IP), error type ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of program or database components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE° MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1034 may facilitate display, execution, interaction, manipulation, or operation of program components through textual or graphical facilities. For example, user interfaces 1034 may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX° web browser, APPLE® SAFARI® web browser, etc. Secure web browsing may be provided using HTTPS (secure hypertext transport protocol), secure sockets layer (SSL), Transport Layer Security (TLS), etc. Web browsers 1036 may utilize facilities such as AJAX, DHTML, ADOBE® FLASH® platform, JAVASCRIPT® programming language, JAVA® programming language, application programming interfaces (APis), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C#, MICROSOFT .NET® programming language, CGI scripts, JAVA° programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for auto resolution of errors during compilation of data segments. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for auto resolution of errors during compilation of data segments, the method comprising:
    detecting, by an error resolving device, one or more errors to be resolved associated with a data segment;
    determining, by the error resolving device, an error type for each of the one or more errors from predefined error types based on neuron activations and a code logic derived from the data segment, wherein determining the error type comprises labelling a new error type upon identification of a new error;
    assigning, by the error resolving device, priorities to the one or more errors based on the determined error type of the corresponding error;
    arranging, by the error resolving device, the one or more errors in a sequence of resolving based on the priorities assigned to the one or more errors;
    predicting, by the error resolving device, a solution for each of the one or more errors by fetching historical data within a database and provided by a user using a deep learning model, wherein the identified new error type and associated solution is stored in the database;
    mapping, by the error resolving device, the predicted solution with the solution provided by the user for each of the one or more errors;
    determining, by the error resolving device, a deviation in the predicted solution from the solution provided by the user;
    re-training, by the error resolution device, the deep learning model based on the deviation in the predicted solution from the solution provided by the user;
    resolving, by the error resolving device, the one or more errors sequentially for generating an error free data segment based on the predicted solution for each of the one or more errors; and
    optimizing, by the error resolving device, the error free data segment based on standard rules, using a machine learning model trained with a plurality of native languages, wherein optimizing comprises:
        generating a pseudo code corresponding to the error free data segment based on encoding and decoding technique; and
        converting the pseudo code into at least one of the plurality of native languages using a transfer learning model, wherein a similar code logic is used for interfacing with any of the plurality of native languages.

2. The method of claim 1, wherein the one or more errors comprise at least one of a syntax error, a semantic error, a compilation time error, a logical error and a run time error.

3. The method of claim 1, further comprising receiving data from one of a plurality of source applications, wherein one of the plurality of source applications is developed using at least one of a JAVA, C, C++, Python, and Scala.

4. The method of claim 3, further comprising:
    converting the data into data segments;
    parsing the data segments; and
    performing semantic analysis on the data segments.

5. The method of claim 1, further comprising training the deep learning model based on modifications performed by the user in the data segment for resolving the one or more errors.

6. The method of claim 1, further comprising:
    computing a score for each of the one or more errors;
    arranging the one or more errors in a sequence of resolving based on the associated score; and
    comparing the score of each of the one or more errors with predefined threshold.

7. The method of claim 1, further comprising:
    creating a checkpoint corresponding to the solution for each of the one or more errors;
    adding a new checkpoint corresponding to a new solution for the new error type; and
    storing the checkpoint and the new checkpoint in the database.

8. The method of claim 7, wherein the checkpoint is a constructive matrix assigned with weights for learning patterns.

9. The method of claim 1, further comprises determining a portable optimization technique for optimizing the error free data segment depending upon an application using a Naive Bayes classifier.

10. A system for auto resolution of errors during compilation of data segments, the system comprising:
    a processor; and
    a memory communicatively coupled to the processor, wherein the memory stores processor instructions, which, on execution, causes the processor to:
        detect one or more errors to be resolved associated with a data segment;
        determine an error type for each of the one or more errors from predefined error types based on neuron activations and a code logic derived from the data segment, wherein determining the error type comprises labelling a new error type upon identification of a new error;
        assign priorities to the one or more errors based on the determined error type of the corresponding error;

arrange the one or more errors in a sequence of resolving based on the priorities assigned to the one or more errors;

predict a solution for each of the one or more errors by fetching historical data within a database and provided by a user using a deep learning model, wherein the identified new error type and associated solution is stored in the database;

map the predicted solution with the solution provided by the user for each of the one or more errors;

determine a deviation in the predicted solution from the solution provided by the user;

re-train the deep learning model based on the deviation in the predicted solution from the solution provided by the user;

resolve the one or more errors sequentially for generating an error free data segment based on the predicted solution for each of the one or more errors; and optimize the error free data segment based on standard rules, using a machine learning model trained with a plurality of native languages, by:
generating a pseudo code corresponding to the error free data segment based on encoding and decoding technique; and
converting the pseudo code into at least one of the plurality of native languages using a transfer learning model, wherein a similar code logic is used for interfacing with any of the plurality of native languages.

11. The system of claim 10, wherein the one or more errors comprise at least one of a syntax error, a semantic error, a compilation time error, a logical error and a run time error.

12. The system of claim 10, wherein the processor instructions further cause the processor to receive data from one of a plurality of source applications, wherein one of the plurality of source applications is developed using at least one of a JAVA, C, C++, Python, and Scala.

13. The system of claim 12, wherein the processor instructions further cause the processor to:
convert the data into data segments;
parse the data segments; and
perform semantic analysis on the data segments.

14. The system of claim 10, wherein the processor instructions further cause the processor to train the deep learning model based on modifications performed by the user in the data segment for resolving the one or more errors.

15. The system of claim 10, wherein the processor instructions further cause the processor to:
compute a score for each of the one or more errors;
arrange the one or more errors in a sequence of resolving based on the associated score; and
compare the score of each of the one or more errors with predefined threshold.

16. The system of claim 10, wherein the processor instructions further cause the processor to:

create a checkpoint corresponding to the solution for each of the one or more errors wherein the checkpoint is a constructive matrix assigned with weights for learning patterns;
add a new checkpoint corresponding to a new solution for the new error type; and
store the checkpoint and the new checkpoint in the database.

17. The system of claim 10, wherein the processor instructions further cause the processor to determine a portable optimization technique for optimizing the error free data segment depending upon an application using a Naive Bayes classifier.

18. A non-transitory computer-readable medium for auto resolution of errors during compilation of data segments, having stored thereon, a set of computer-executable instructions causing a computer comprising one or more processors to perform steps comprising:
detecting one or more errors to be resolved associated with a data segment;
determining an error type for each of the one or more errors from predefined error types based on neuron activations and a code logic derived from the data segment, wherein determining the error type comprises labelling a new error type upon identification of a new error;
assigning priorities to the one or more errors based on the determined error type of the corresponding error;
arranging the one or more errors in a sequence of resolving based on the priorities assigned to the one or more errors;
predicting a solution for each of the one or more errors by fetching historical data within a database and provided by a user using a deep learning model, wherein the identified new error type and associated solution is stored in the database;
mapping the predicted solution with the solution provided by the user for each of the one or more errors;
determining a deviation in the predicted solution from the solution provided by the user;
re-training the deep learning model based on the deviation in the predicted solution from the solution provided by the user;
resolving the one or more errors sequentially for generating an error free data segment based on the predicted solution for each of the one or more errors; and
optimizing the error free data segment based on standard rules, using a machine learning model trained with a plurality of native languages, wherein optimizing comprises:
generating a pseudo code corresponding to the error free data segment based on encoding and decoding technique; and
converting the pseudo code into at least one of the plurality of native languages using a transfer learning model, wherein a similar code logic is used for interfacing with any of the plurality of native languages.

* * * * *